April 21, 1953 C. B. H. FELDMAN 2,636,081

SUPERVISORY CIRCUITS FOR PULSE CODE MODULATION

Filed July 27, 1950 6 Sheets-Sheet 1

INVENTOR
C. B. H. FELDMAN
BY H. A. Burgess
ATTORNEY

April 21, 1953 C. B. H. FELDMAN 2,636,081

SUPERVISORY CIRCUITS FOR PULSE CODE MODULATION

Filed July 27, 1950 6 Sheets-Sheet 2

INVENTOR
C. B. H. FELDMAN
BY H. A. Burgess
ATTORNEY

INVENTOR
C. B. H. FELDMAN
BY H. A. Burgess
ATTORNEY

April 21, 1953 C. B. H. FELDMAN 2,636,081

SUPERVISORY CIRCUITS FOR PULSE CODE MODULATION

Filed July 27, 1950 6 Sheets-Sheet 4

INVENTOR
C. B. H. FELDMAN
BY H. A. Burgess
ATTORNEY

April 21, 1953 C. B. H. FELDMAN 2,636,081

SUPERVISORY CIRCUITS FOR PULSE CODE MODULATION

Filed July 27, 1950 6 Sheets-Sheet 5

INVENTOR
C. B. H. FELDMAN
BY H. A. Burgess
ATTORNEY

INVENTOR
C. B. H. FELDMAN
BY H. A. Burgess
ATTORNEY

Patented Apr. 21, 1953

2,636,081

UNITED STATES PATENT OFFICE 2,636,081

SUPERVISORY CIRCUITS FOR PULSE CODE MODULATION

Carl B. H. Feldman, Summit, N. J., assignor to Bell Telephone Laboratories, Incorporated, New York, N. Y., a corporation of New York Application July 27, 1950, Serial No. 176,106

9 Claims. (Cl. 178—43.5)

This invention relates to signaling and more particularly to signaling in pulse code modulation systems.

It is an object of this invention to transmit supervisory signals over the signal channels of a pulse code modulation system.

It is also an object of the invention to send auxiliary signals over the primary signal channels of a pulse code modulation system without appreciably interrupting or unduly impairing the primary message being transmitted.

It is a further object to reserve certain permutation code groups in a pulse code modulation system and to send the groups so reserved only in response to auxiliary signals. It is also an object to recognize the reserved code groups at a receiver and to energize indicating means in response to such recognition.

Systems wherein intelligence is transmitted by periodic samples represented by groups of pulses arranged in accordance with a given code are known as pulse code modulation systems. Such a system is described in an article by L. A. Meacham and E. Peterson entitled "An Experimental Multichannel Pulse Code Modulation System of Toll Quality" which appears in the Bell System Technical Journal, vol. 27, No. 1, January 1948, at page 1. In a system such as discussed therein the signal wave to be transmitted is periodically sampled and the samples are converted into a combination of pulses or spaces arranged in accordance with a given code. For the purposes of illustration a binary code will be referred to although the invention is not limited to any specific code. The binary condition is usually represented in a pulse system by an "on" or "off" pulse, i. e., either a pulse is transmitted or it is not. The number of designated signal amplitudes which may be represented by a given code is a function of the number, of digits or elements in each code group. For example, with a 7-digit code group, $2^7$ or 128 permutations are possible so that 128 discrete signal amplitudes may be represented by a binary code.

It is often necessary for the operators or supervisors at the terminals of a communication system to signal certain information to each other. For example, in a telephone system it may be necessary for the terminal operators to signal the fact that a call is being made over a particular channel, that a connection has been completed, that the call is terminated etc. In telephone practices this normally requires the equivalent of an additional signaling channel for each speech channel.

In accordance with an illustrative embodiment of the present invention hereinafter disclosed in detail certain permutation code groups are reserved for auxiliary signaling purposes. The code groups so reserved are thereby made unavailable for representing speech ampltiudes but the number used for auxiliary signaling purposes represents such a small part of the total number of permutation code groups that no appreciable loss of transmission quality results. In addition to transmission of supervisory signals the additional channels may be used for dialing, for telegraph, teletypewriter signals etc.

The invention may be better understood by a consideration of the following detailed description when read in accordance with the attached drawings in which.

Figure 1:
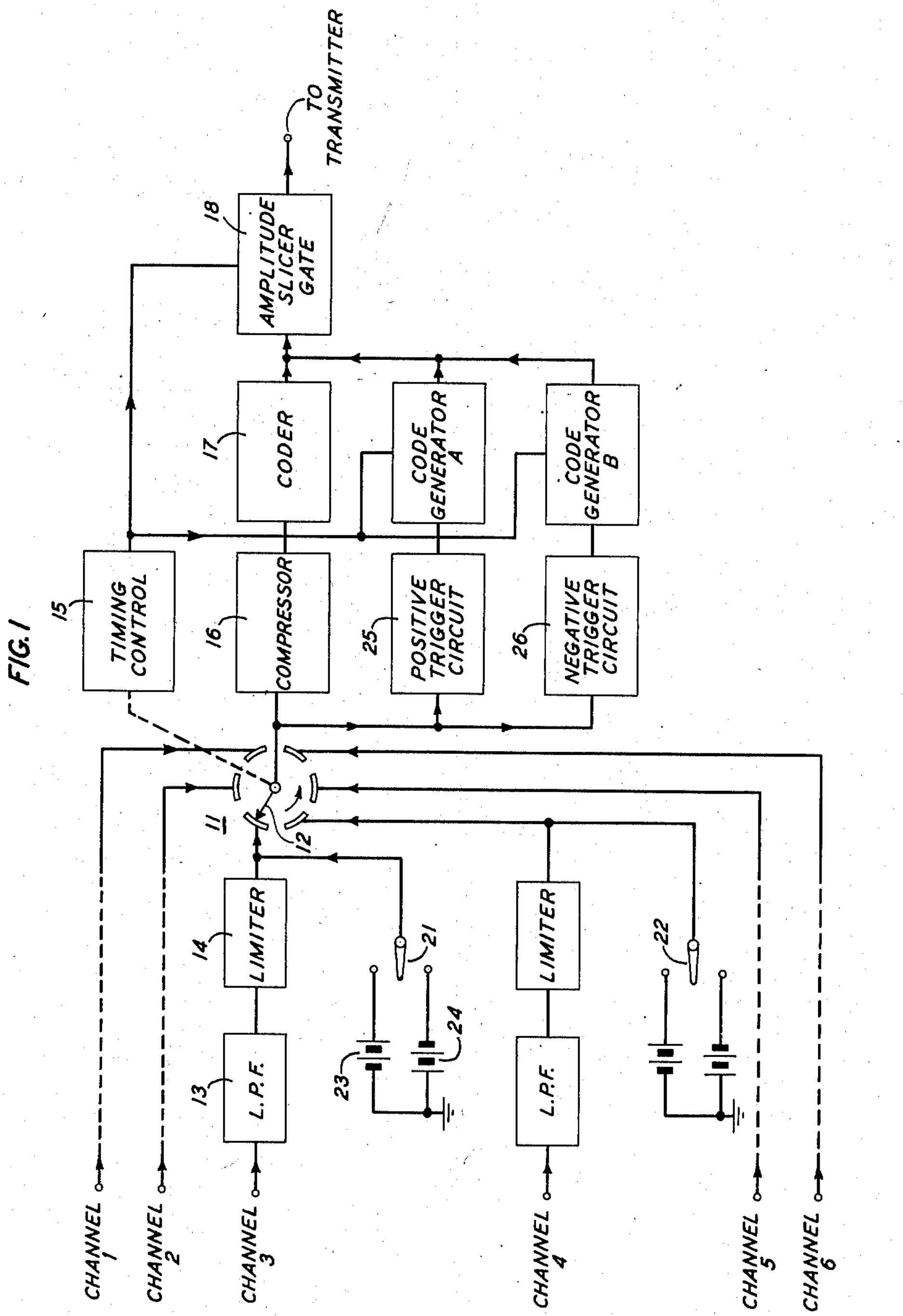
Fig. 1 shows, in block schematic, pulse code modulation transmitting equipment which is illustrative of the present invention.

Referring now to Fig. 1, the speech channel inputs of a pulse code modulation system are connected to a time division multiplex distributor 11 represented symbolically by a rotating contact arm 12 sweeping over the channel terminal contacts in time sequence. Each channel is connected, as is illustrated in the figure only for channels 3 and 4, through a low-pass filter 13 passing only frequencies below half the repetition frequency of the distributor 11 and an amplitude limiter 14 which holds the channel voltage output below a definite maximum value so that the voltage range of the coder is not exceeded. The timing control circuit 15 controls the sequence of operation of the various elements of the transmitter and may, for example, be as is disclosed in the aforementioned Meacham-Peterson article and also in a copending joint application of J. G. Kreer and E. Peterson, Serial No. 766,280, filed September 26, 1947, which issued as Patent 2,527,638 on October 31, 1950. The basic control of the timing control circuit is a crystal-controlled oscillator tuned to a frequency equal to the code element rate and whose output is shown as wave form I of Fig. 9. Message samples from the various channel inputs are taken from the contact arm 12 of the distributor 11 and are applied through the compressor 16 to the coder 17. The compressor discriminates in favor of low amplitude signals and the coder converts the samples into groups of pulses arranged in accordance with the particular code for which the coder is adapted. The permutation code groups are then passed through an amplitude slicer and gate 18 which shapes and accurately times the pulse and then passes them on to the transmitter.

Switches, such as the switches 21 and 22 shown connected to channels 3 and 4 are provided with each channel for supervisory signaling purposes. As shown, two different supervisory signals are provided. Referring specifically to the switch 21 associated with channel 3, when it is closed on its upper contact a positive voltage is placed on the distributor contact assigned to channel 3, and when it is closed on its lower contact a negative voltage is placed on the channel 3 distributor contact. The switch 21 should, of course, be held closed for at least one repetition period of the distributor arm 12 to insure that the supervisory signal is applied to the distributor contact assigned to channel 3. The positive and negative voltages supplied by the batteries 23 and 24 respectively are larger than any voltage which the limiter 14 in the channel input will pass. Connected to the common output of the distributor 11 in parallel with the compressor 16 and coder 17 are positive and negative trigger circuits 25 and 26. The positive trigger circuit 25 will deliver an output only if a positive voltage greater than any voltage passed by the limiter 14 is applied to its input. Likewise the negative trigger circuit will deliver an output only if a negative voltage larger than any negative voltage passed by the limiter 14 is applied to its input.

Therefore, closing switch 21 on its upper or positive contact causes the positive trigger circuit 25 to deliver an output pulse coincident with the arrival of the normal speech sample from channel 3 at the coder 17. Likewise, closing switch 21 on its negative contact causes the negative trigger circuit to deliver an output signal coincident with the arrival of the speech sample from channel 3 at the coder. There are thus made available a choice of two distinct supervisory signals which may be assigned any two desired distinct code groups to be substituted for the coder output values obtained from the speech channel itself.

Figure 11A:
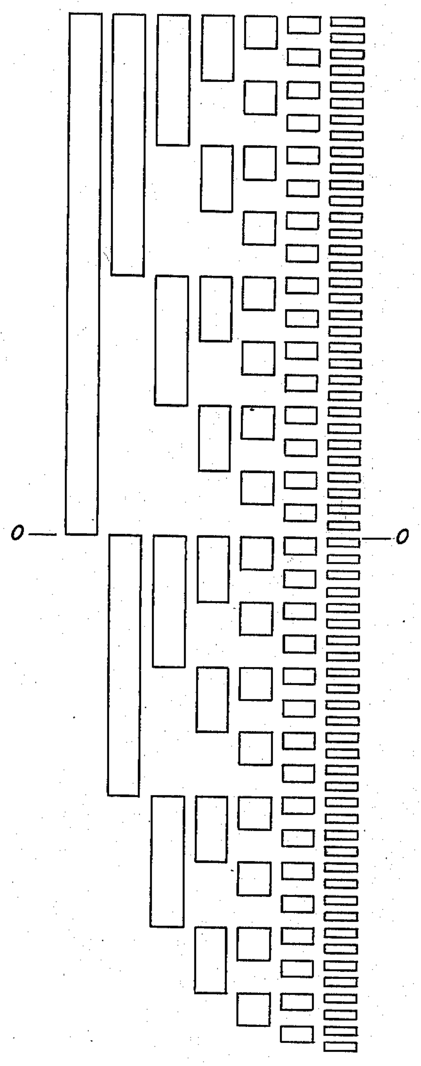
Figs. 11A and 11B illustrate aperture plates for use with a conventional binary code.

Since the code groups reserved for supervisory signaling are unavailable for representing signal amplitudes and for other considerations to be discussed later, a preferred pair of code groups to be used for the supervisory signals are those corresponding to the smallest positive and smallest negative channel samples which the coder is capable of distinguishing. In the natural binary system of seven digits, for example, these two values are assigned the codes 1000000 and 0111111 respectively. This may be seen by reference to Fig. 11A where there is shown an aperture plate for use in a beam coding tube of the type described in an article by R. W. Sears entitled "Electron Beam Deflection Tube for PCM" which appears in the above-mentioned volume of the Bell System Technical Journal at page 44. The apertures in the plate are arranged in accordance with the natural binary code of seven digits and the zero signal trajectory of the beam is indicated by the axis 0. The codes representing the smallest positive and negative samples are also particularly favorable combinations for design of suitable recognizing equipment and hence the operation of the system will be explained in terms of their use for supervisory signaling purposes although the invention is not limited to the use of any particular code or code groups.

Connected to the positive trigger circuit 25 is a code generator A which is adapted to deliver the code group 1000000 when a pulse is received from the positive trigger circuit. Similarly, code generator B connected to the negative trigger circuit 26 delivers the code group 0111111 in response to the receipt of a pulse from the negative trigger circuit.

Figures 2, 3:
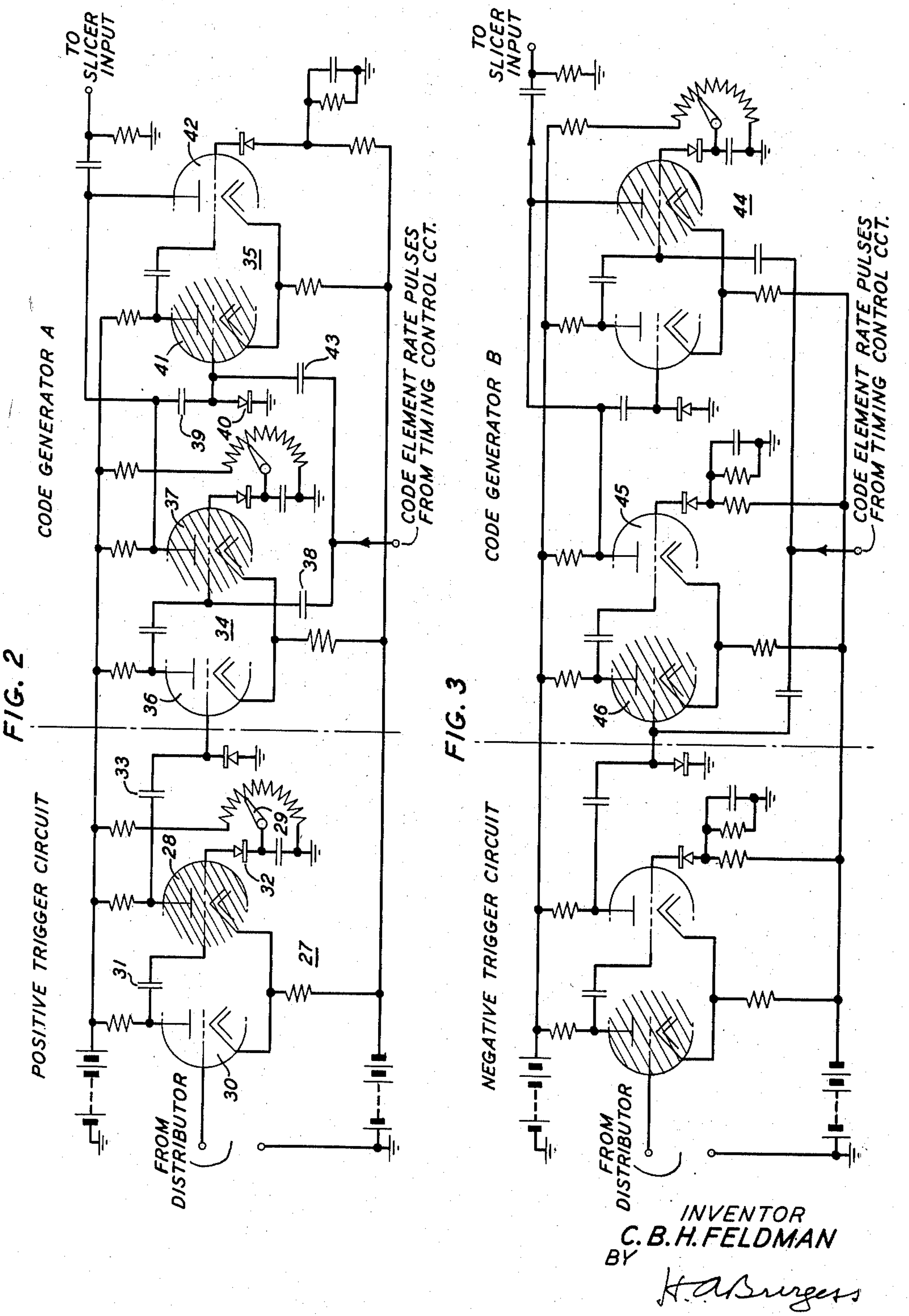
Figs. 2 and 3 show in schematic, trigger circuits and code generators which may be incorported in the circuit of Fig. 1.

Circuits for performing the triggering and code generating functions just described are shown in Figs. 2 and 3. In Fig. 2 is shown a positive trigger circuit and a code generator for delivering a pulse followed by six spaces. The positive trigger circuit comprises a single trip multivibrator 27 of a well-known type. The shaded tube 28 is normally conducting due to the positive bias applied to its grid by potentiometer 29. However, when a positive pulse of a voltage larger than any positive voltage delivered by limiter 14 is applied to the grid of tube 30 conduction will take place in tube 30 and tube 28 will be cut off. Tube 28 will regain control when condenser 31 has discharged sufficiently through diode 32 to again make the grid of tube 28 positive. By this action a positive pulse is produced on the output of tube 28 which is applied through the coupling condenser 33 to the code generator A.

The code generator A comprises a pair of single-trip multivibrators 34 and 35 connected in tandem with the normally conducting tubes indicated by shading. Multivibrator 34 reverses when a positive pulse is applied to the grid of tube 36 from the positive trigger circuit. The resistances and capacitances associated with the multivibrator 34 are proportioned to give it a return time approximately equal to but slightly greater than the duration of one code element. Its return time is then accurately determined at th end of a code element period by narrow timing pulses which are applied to the grid of tube 37 through condenser 38. These timing pulses occur at the code element rate and may be developed from the basic standard frequency supply of the timing control circuit of Fig. 1, for example, by limiting, differentiating and rectifying the output of the code element rate oscillator previously referred to whose output is shown as wave form I of Fig. 9. The code element rate timing pulses appear as wave form II. A positive pulse is therefore produced on the output of tube 37 when multivibrator 34 is triggered. The trailing edge of this positive pulse, by the action of the differentiator comprising the condenser 39 and diode 40, triggers the multivibrator 35, causing tube 41 to cut off and tube 42 to conduct. Multivibrator 35 is designed to have a return time approximately equal to but slightly greater than six code elements. Its return is accurately determined at the end of the sixth code element period by the timing pulses supplied to the grid of tube 41 through condenser 43. As is well known, these timing pulses have no effect on the multivibrators 34 and 35, except during the time when the multivibrators are in a condition to be reversed.

It will be seen therefore that immediately following the positive pulse produced by tube 37 a negative pulse having a duration accurately equal to six code elements is produced on the output of tube 42, and since the outputs of tubes 42 and 37 are connected together a permutation code group of 1000000 is applied to the slicer input. The output from code generator A is illustrated by wave form III of Fig. 9. The crystal rectifiers connected to the multivibrator grids of Fig. 2 act to restore the multivibrators to their proper direct-current level as is explained in a copending application of L. A. Meacham Serial No. 772,913, filed September 9, 1947, which issued as Patent 2,537,843 on January 9, 1951.

An arrangement is shown in Fig. 3 for generating the code group 0111111 when a negative voltage exceeding any voltage passed by limiter 14 is received from the distributor. The apparatus is like that in Fig. 2 except for a reversal of negative and positive grid biases and the output of code generator B, when triggered by the negative trigger circuit is illustrated by wave form IV of Fig. 9.

It is necessary for the code output from the code generators A and B to overpower any codes which may be delivered by the coder 17. Therefore, the positive and negative pulses supplied by pulse generators A and B are made to be substantially larger in magnitude than any voltage which the coder 17 can deliver. The slicer 18 then determines the outgoing code to be that dictated by the code generators A and B during their active periods.

Figure 11B:
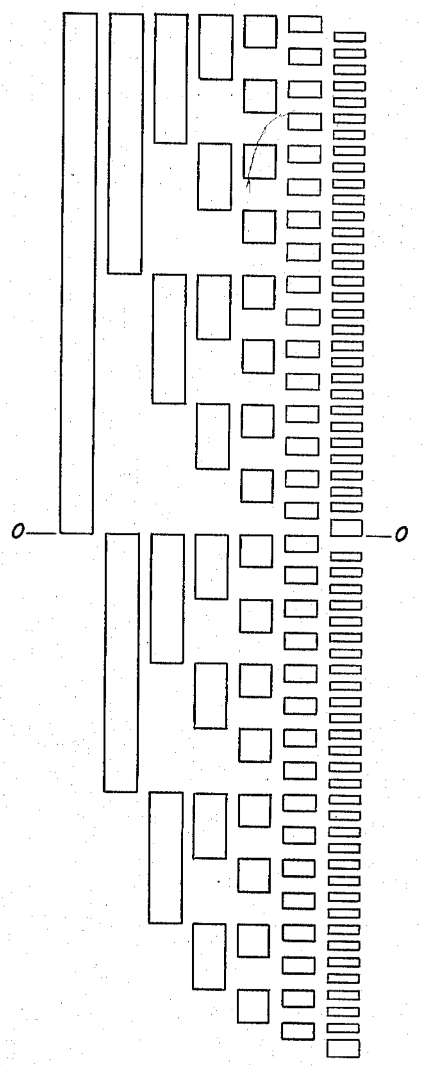

It is also necessary to insure that the code groups 1000000 or 0111111 are never generated by the coder itself from the normal sample received from the signal channel in the absence of impressed supervisory signals. This prevention may easily be accomplished when a beam coder tube as described in the above-mentioned article by R. W. Sears is used by modifying the aperture plate of the coder. Referring to Fig. 11B the apertures corresponding to 1000000 and 0111111 are omitted and in their place the adjacent apertures are extended so that the signals in the range normally coded 1000000 are coded 1000001 and the signals in the range 0111111 are coded 0111110. The resulting decoded magnitudes then differ from the original values by no more than the smallest coded step. If too much error is introduced by this method, an alternative method is to redesign the aperture plate omitting the code groups reserved for supervisory signaling, evenly spacing the remaining apertures above and below the zero signal axis of the aperture plate and making necessary compensations in the decoder.

Figures 4, 9:
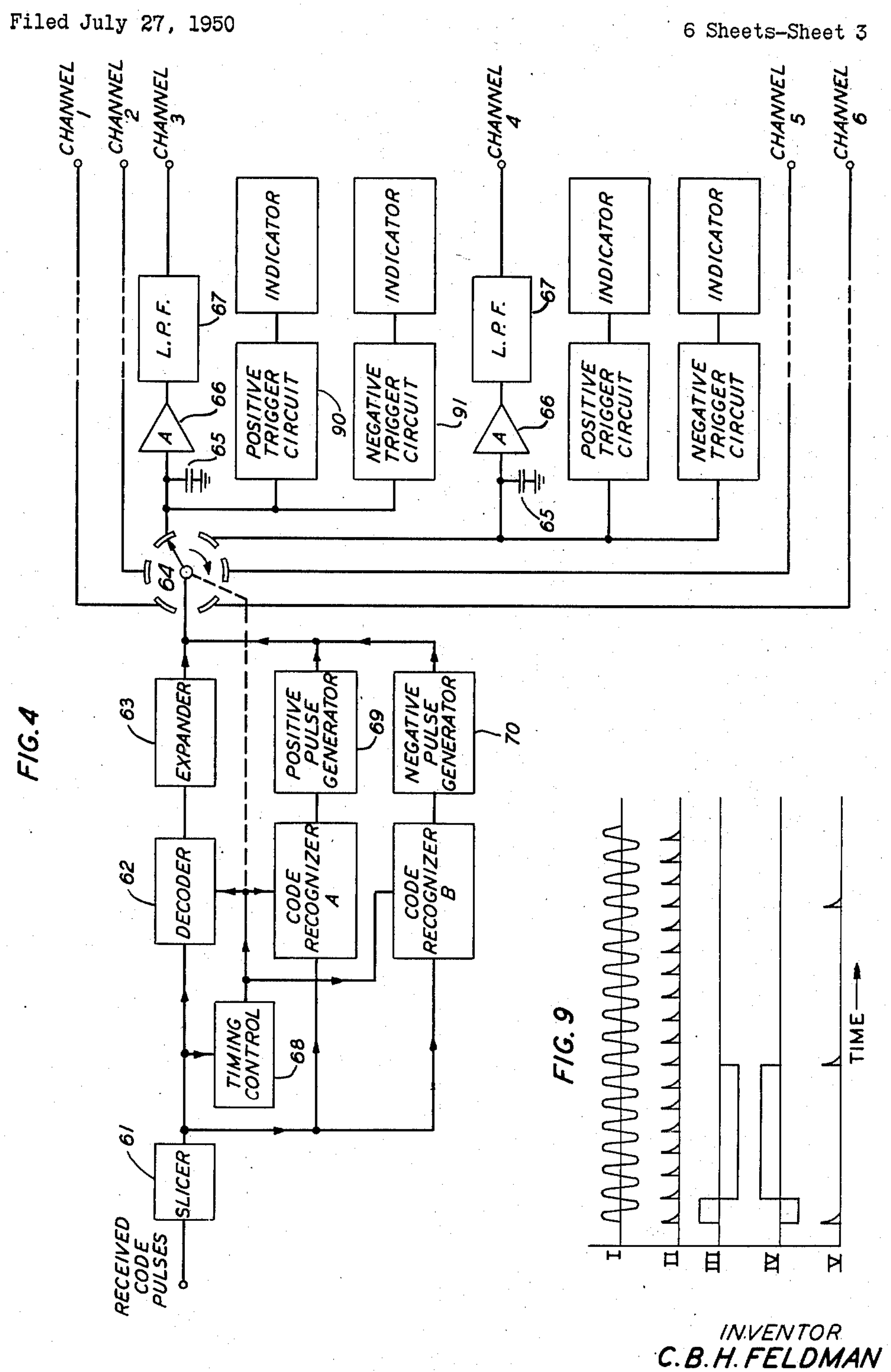
Fig. 4 shows in block schematic, pulse code modulation receiving equipment illustrative of the present invention.
Figs. 9 and 10 show descriptive wave forms.

At the receiving terminal, Fig. 4, the received pulses from the detector of the receiver are applied through a slicer 61 to the decoder 62. The amplitude samples recovered by the decoder 62 are passed through the expander 63 which discriminates in favor of high amplitudes in such a manner as to compensate for the action of the compressor 16 at the transmitter, Fig. 1. The recovered samples are periodically applied by means of distributor 64 to charge a channel storage condenser 65, the voltage on which is amplified by amplifier 66 and filtered by low-pass filter 67 as is illustrated for channels 3 and 4. Channel condensers 65 hold the charges left on them by distributor 64 for a complete period of the latter and receive a new charge once each period when distributor 64 engages their channel contacts. The timing control circuit 68 recovers the pulse repetition frequency from the incoming pulses and derives therefrom the necessary timing pulses to synchronize the receiving equipment with the transmitter. A complete description of a method of synchronization is given in the aforementioned Kreer-Peterson patent.

The received pulses after being passed through the slicer 61 are applied to two codes recognizers A and B respectively as well as to the decoder 62. Code recognizer A is adapted to trigger the positive pulse generator 69 only when the permutation code group 1000000 is received while recognizer B triggers the negative pulse generator 70 only when code group 0111111 is received.

Figures 5, 5A, 6, 6A:
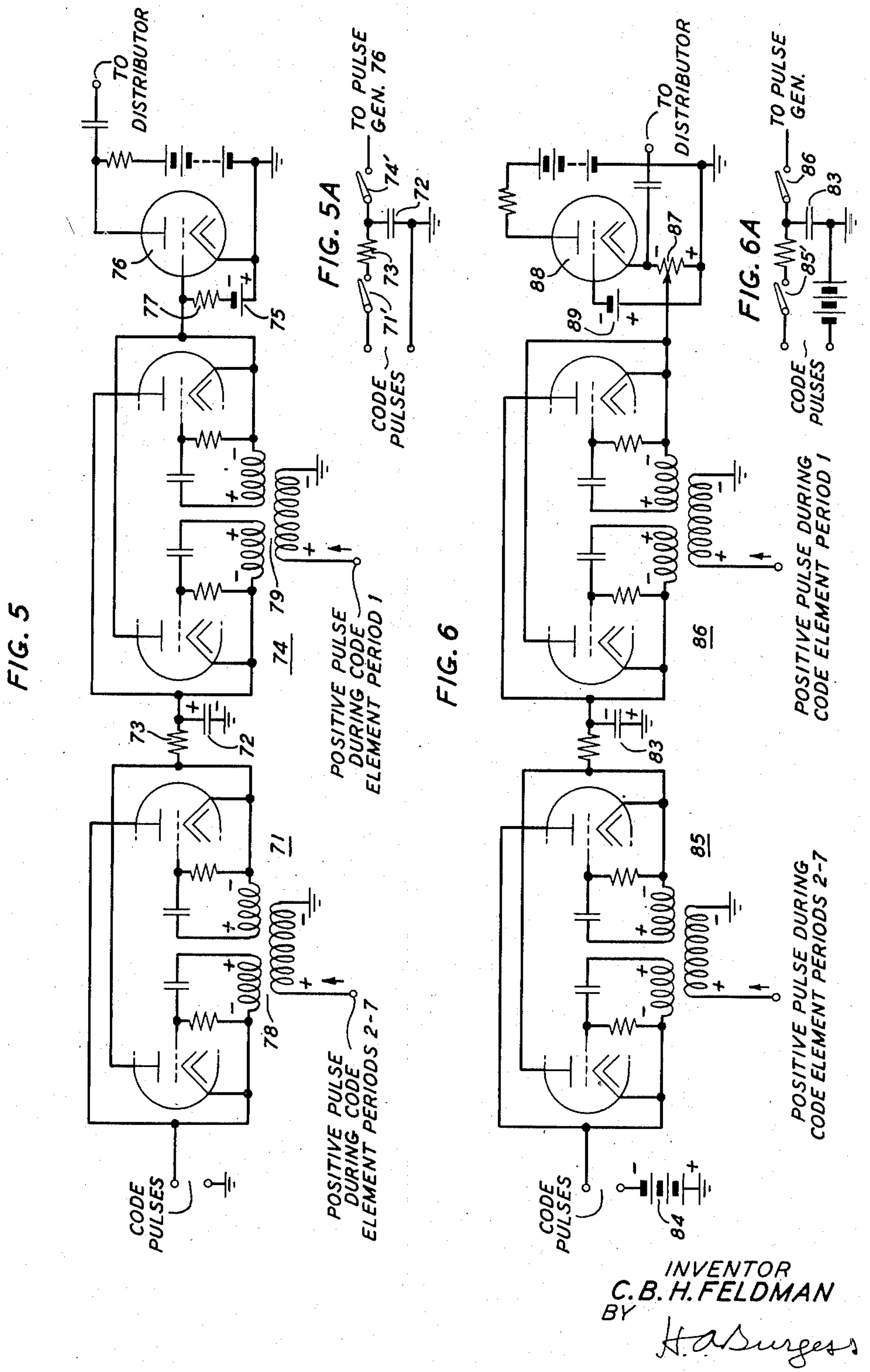
Figs. 5, 5A and 6 show in schematic, recognizer circuits and pulse generators which may be incorporated in the circuit of Fig. 4.
Figure 7:
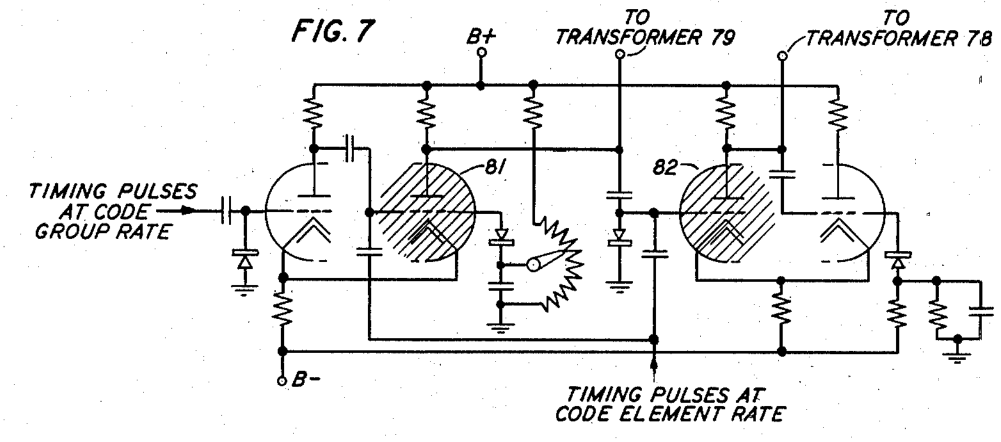
Fig. 7 shows in schematic, an illustrative portion of the timing control circuit of Fig. 4.

Circuits for recognizing the supervisory code groups and for producing the negative and positive pulses are shown by way of example in Figs. 5 and 6. The code recognizer B of Fig. 5 is shown diagrammatically in Fig. 5A. Switch 71' is closed during code element periods 2 through 7 permitting the incoming pulses, if any, to charge the condenser 72 through resistor 73. Switch 74' is closed only during the first code element period during which time the condenser 73 discharges through the switch 74'. The battery 75 in Fig. 5 applies a sufficient negative bias to the pulse generator 76 so that when condenser 72 discharges through the grid biasing resistor 77 the tube will conduct only if the condenser has been charged by six consecutive pulses. In other words it is critically biased to distinguish between the condition when condenser 72 is charged by less than six pulses and when it is charged by six pulses. When tube 76 is triggered to conduction, a negative pulse is formed on its plate which is applied to the distributor 64 of Fig. 4. The actual switches 71 and 74 shown in Fig. 5 are described in more detail in the aforementioned Meacham-Peterson article and each comprise a pair of triodes connected in parallel and poled in opposite directions. The triodes are self-biased to cut-off and conduct only when a positive pulse is present on both tube grids. Each pair of triodes therefore operates substantially as an open circuit when no positive pulse is present on their grids and as a low impedance when a pulse is present. The resistor 73 is large compared to the effective series resistance of the conducting triodes so that variations therein will have negligible effect on the charge of condenser 72. A positive pulse is applied to the tube grids of switch 71 during code element periods 2 through 7 and to the tube grids of switch 74 during code element period 1 of each code group. A circuit for accomplishing this result is indicated in Fig. 7 and is in general similar to the tandem-connected single trip multivibrators of Fig. 2.

Referring to Fig. 9 the input pulses comprise a series of positive pulses timed to coincide with the beginning of each code group. These pulses may be developed, for example, from the aforementioned control wave which has a frequency equal to the pulse rate and which is derived from the incoming code pulses by differentiating and rectifying the control wave and then passing it through a seven-to-one step-down multivibrator whose output is also differentiated and rectified. The resultant pulse train is illustrated by wave form V of Fig. 9 where wave form I corresponds to the control wave recovered at the receiver from the incoming pulses and wave form II corresponds to the pulses which drive the seven-to-one step-down multivibrator. Tube 81 will produce a position pulse at its plate during the first code element period and tube 82 will produce a positive pulse during code element periods 2 through 7. These pulses are applied to the grids of triode switches 71 and 74 by the transformers 78 and 79 respectively, whose secondary windings are poled so that both grids will be driven positive when a positive pulse is present in the primary. The reversal times of the tandem-connected multivibrators are controlled by the timing pulses, wave form II of Fig. 9, which occur at the code element rate as described in connection with Fig. 2.

A code recognizer and positive pulse generator for code group 1000000 could be constructed from the code recognizer and associated pulse generator for code 0111111 by inserting polarity reversals ahead of and after the circuit of Fig. 5.

Alternatively, the circuit shown in Fig. 6 may be used. Here, the condenser 83 is charged a maximum negative amount from a biasing battery 84 if no code pulses are received during the six consecutive active intervals of the electronic switch 85. The negative voltage on condenser 83 is then discharged by the second electronic switch 86 through a resistor 87 in series with the cathode of the positive pulse generating tube 88 thereby making the cathode negative with respect to its grid. The grid of tube 88 is given an initial negative bias by battery 89 in an amount such that the current flowing through resistor 87 will be sufficient to trigger the tube only when condenser 83 has a maximum negative charge, which in turn will occur only when no code pulses occur during code element periods 2 through 7. The positive increment of voltage between the cathode and ground when tube 88 conducts is used to form the desired output pulse. The pulses which operate switches 85 and 86 may be derived as explained in connection with Fig. 5. Means for recognizing a particular permutation code group are also disclosed in a copending application of F. Gray Serial No. 160,951, filed May 9, 1950.

Pulse generators 69 and 70 produce pulses larger in magnitude than any output delivered by the expander 63 from the decoded channel signals. Also, the duration of these large amplitude pulses is made small compared to the time available for one channel contact on the distributor.

Figure 10:
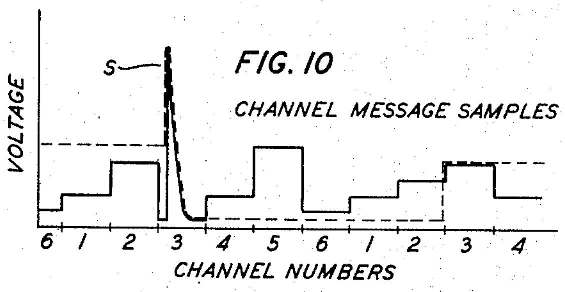

Referring now to Fig. 10, the solid-line wave form represents the recovered message samples, applied in turn, to charge their respective channel condensers 65. The dotted-line wave form represents the charge on channel 3 condenser 65. If the code group received for channel 3 is 1000000 positive pulse generator 69 will deliver a large short positive pulse. Pulse generators 69 and 70 are designed and timed to deliver, when triggered, large short pulses in the early portion of the time interval assigned distributor 64 for each channel contact. Further, generators 69 and 70 are low impedance sources so that the large charges placed on channel condensers 65 will leak off through the generators before the distributor 64 has stepped to a subsequent contact. The high signaling peak will therefore be applied to the receiver but for a very short instant and not for a full period of distributor 64. The charge left on condenser 65 after the large peak has leaked off is determined by the decoded output of expander 63. The decoder output is in this case the smallest step above zero and this amplitude is not far different from the true value which the supervisory code replaced if the talker were momentarily quiet. If the talker were speaking, the falseness of the decoded supervisory code would be masked. It is for this additional reason that code groups representing the smallest signal amplitude are chosen for supervisory signaling.

On the output of each distributor contacts are connected positive and negative triggering circuits 90 and 91 which may, for example, be similar to the trigger circuits shown in Figs. 2 and 3. The positive triggering circuit 90 delivers output only when a large positive voltage appears on its input and the negative triggering circuit 91 delivers output only when a large negative voltage appears on its input. These outputs may be used to operate relays, energize lamps or other signaling devices or perform any other desired indication of the required supervisory function.

Since the code recognizers are disabled during the first code interval of each group to permit the condensers 72 and 83 to discharge they cannot distinguish whether or not a pulse was present during the first interval. It is therefore necessary to prevent the normal channel signals from generating the codes 1111111 or 0000000 as well as the two codes 0111111 and 1000000, which, as previously mentioned, are suppressed by the aperture plate of the coder 17 at the transmitter. A further change in the aperture plate is therefore required in that 1111110 is extended to cover the range normally covered as 1111111 and 0000001 is extended to cover the range normally covered as 0000000 as is illustrated by Fig. 11B. A total of four codes is therefore omitted from the aperture plate.

Figure 8A:
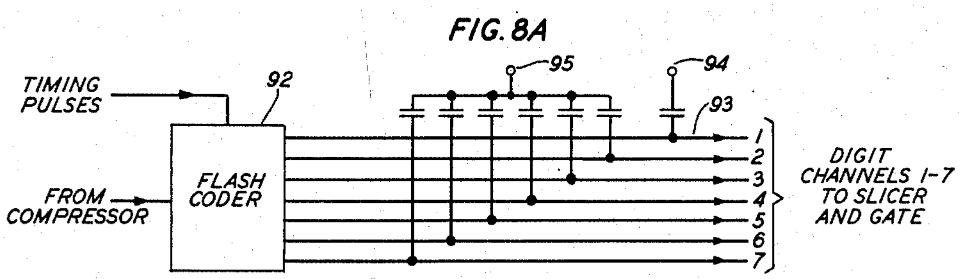
Figs. 8A and 8B show schematically modifications of the circuits of Figs. 1 and 9, respectively, for use with coders and decoders of the "flash" type.

A modification of the circuits shown in Figs. 2 and 3 is possible for operation with a so-called "flash coder" of the type described in a copending application of W. M. Goodall, Serial No. 37,035, filed July 3, 1948. As compared with the sequential coder described in the Meacham-Peterson article previously cited which delivers the code pulses sequentially, the flash coder delivers all of the pulses in a code group simultaneously. Referring now to Fig. 8A, the incoming signal sample from the compressor 16 of Fig. 1 is transformed by the flash coder 92 into a seven-digit code group. The on or off pulses representing each digit appear simultaneously on the seven output leads. The seven digits may be transmitted simultaneously, for example, on seven different carriers, or may be transformed by delay circuits into a sequence of pulses. When such a coder is used, the code generating multivibrators 35 and 44 of Figs. 2 and 3, which deliver the longer pulses, may be omitted. In Fig. 2, the positive output from the plate of tube 37 would then be connected to the output circuit 93 of the flash coder which carries the first digit of the code group by means of lead 94. A negative pulse output from the plate terminal of tube 36 would be impressed on the remaining digit circuits by means of lead 95. The plate terminal of tube 45 of Fig. 3 would be connected to lead 94 of Fig. 5, and the plate terminal of tube 46 would be connected to lead 95.

Figure 8B:
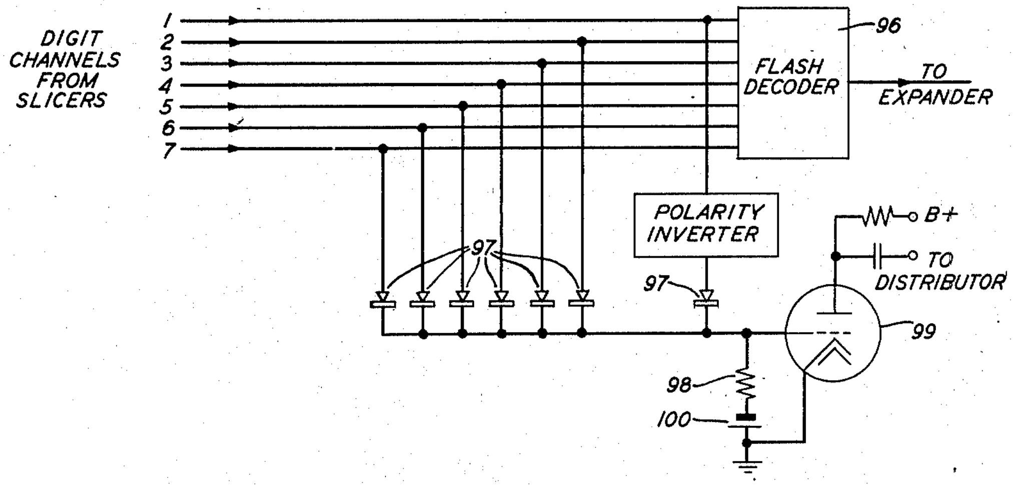

Referring now to Fig. 8B, at a receiver employing a flash decoder, the code elements are applied to the decoder 96 simultaneously. The code group 0111111 may be recognized by connecting the individual digit channels through series rectifying elements 97 to a common resistor 98. The voltage across the resistor is connected to the grid of a trigger tube 99, which is biased by battery 100 to deliver no output except when all of the digit pulses are of the same polarity. The polarity of the first digit is reversed, for example, by a single stage amplifier, before being applied to the rectifier, so that code group 0111111 becomes 1111111 when applied to the seven rectifiers 97. To recognize code group 1000000, a polarity inverter would be inserted in the connections to digit channels 2 through 7 in a similar manner and omitted from digit channel 1. It will be apparent that the recognizer distinguishes all seven digits so that it is unnecessary to delete the code 0000000 and 1111111 from the coder.

Although the invention has been described in connection with specific embodiments, numerous other modifications will readily occur to one skilled in the art without departing from the spirit of the invention.

What is claimed is:

1. In a system for the transmission of intelligence wherein the intelligence is transmitted by groups of pulses in accordance with a given code, said code having a maximum number $m$ of possible permutation code groups, means for representing successive samples of intelligence to be transmitted by a number of permutation code groups $n$ fewer than said maximum number $m$, means responsive to an auxiliary input signal for preventing the transmission of any of said $n$ code groups and for transmitting one of the said $m$ code groups other than said $n$ groups, receiving means to recover said intelligence from said $n$ code groups, and indicating means selectively responsive only to code groups other than said $n$ groups.

2. In a system for communicating by pulse code modulation employing permutation code groups each of a fixed number of pulses each of any of a fixed number of signaling conditions, means for representing successive samples of a message wave by fewer than the total possible permutation code groups, means responsive to an auxiliary input signal for preventing the transmission of any of the message wave representative code groups for any sample and for simultaneously transmitting at least one of the remaining permutation code groups, and receiving means selectively responsive to any of said remaining code groups to the exclusion of the message wave representative code groups.

3. In a system for communicating by pulse code modulation employing groups of pulses arranged in accordance with a given code having a maximum number $m$ of possible permutation code groups, means for representing successive samples of a signal wave to be transmitted by a number of $n$ code groups fewer than said maximum number $m$, means responsive to an auxiliary input signal for generating one of said $m$ code groups other than any of said $n$ groups, means for transmitting said generated code group to the exclusion of any of said $n$ code groups which may be generated simultaneously therewith by said first-named means, receiving means to recover said signal wave from received code groups, and indicating means responsive only to code groups other than said $n$ code groups.

4. In a system for communicating by pulse code modulation wherein periodic samples of a signal wave to be transmitted are converted into code groups of pulses arranged in accordance with a given code having a finite number of permutation code groups, said code groups being indicative of a unique and discrete amplitude range within which the amplitude of said sample falls, means for preventing said signal wave from being converted into at least a first of said code groups, auxiliary means under control of an operator for generating said first code group, means for selecting said first code group when generated in preference to any other code group, means at a receiver for recognizing said first code group, means for generating a pulse only in response to the recognization of said first code group, and indicating means connected to said last-named means and adapted to be energized by said pulse.

5. In a system for communicating by pulse code modulation wherein a signal wave to be transmitted is periodically sampled and the samples are converted into a group of pulses arranged in accordance with a given code, said code having a maximum number of permutation code groups, means responsive to an auxiliary signal of a first predetermined nature for generating a first of said permutation code groups, means responsive to an auxiliary signal of a second predetermined nature for generating a second of said permutation code groups, means to prevent said signal wave from generating said first or said second code groups, means to transmit either of said first or said second code groups, when generated, to the exclusion of any other permutation code groups generated simultaneously therewith in response to said signal wave, and means at a receiver operable in response only to either of said first and second code groups for indicating the receipt of said first or second code groups.

6. In a system for communicating by pulse code modulation, means for periodically sampling a signal wave to be transmitted, means for converting each of said samples according to their amplitude into a group of pulses arranged in accordance with a given code having a finite number of permutation code groups, auxiliary means for generating at least one of said permutation code groups, means for causing the sample amplitudes which would normally be converted into the code groups generated by said auxiliary means to be converted into the permutation code groups representative of samples one discrete amplitude removed, means at a transmitter for selecting code groups of pulses generated by said auxiliary means in preference to groups of pulses formed by said second-named means, recognizer means at a receiver, one for each of the code groups of pulses generated by said auxiliary means, adapted to produce an output only upon the receipt of a predetermined one of the code groups of pulses generated by said auxiliary means, and indicating means connected to be energized by said recognizer means.

7. In a system for communicating by pulse code modulation wherein a signal wave to be transmitted is periodically sampled and the samples are converted into code groups of pulses according to a natural binary code of $n$ digits having $2^n$ permutations, each of said permutations being indicative of a discrete and unique amplitude range, a first and a second code generator for generating pulses representing a first and a second of said $2^n$ permutations, means for representing successive samples of a message wave by permutation code groups other than said first and second code groups, means responsive to an auxiliary signal for preventing the transmission of message wave representative code groups and for simultaneously transmitting one of said first and second code groups, and receiving means selectively responsive to said first and second code groups to the exclusion of all others.

8. The combination in accordance with claim 7, wherein $n$ equals seven and where said first and second code groups are, respectively, 1000000 and 0111111.

9. The further combination in accordance with claim 8, wherein successive samples of a message wave are represented by permutation code groups other than 1000000, 0111111, 1111111, and 0000000.

CARL B. H. FELDMAN.

No references cited.